(12) United States Patent
Bharitkar et al.

(10) Patent No.: US 12,231,865 B2
(45) Date of Patent: Feb. 18, 2025

(54) VIDEO-DERIVED AUDIO PROCESSING

(71) Applicant: SAMSUNG ELECTRONICS CO., LTD., Suwon-si (KR)

(72) Inventors: Sunil Bharitkar, Stevenson Ranch, CA (US); Seongnam Oh, Irvine, CA (US); Carlos Tejeda Ocampo, Tuxtla Gutiérrez (MX)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 18/154,678

(22) Filed: Jan. 13, 2023

(65) Prior Publication Data

US 2024/0244386 A1 Jul. 18, 2024

(51) Int. Cl.
*G11B 27/036* (2006.01)
*G06V 20/40* (2022.01)
*H04S 7/00* (2006.01)

(52) U.S. Cl.
CPC ........... *H04S 7/30* (2013.01); *G06V 20/46* (2022.01); *G11B 27/036* (2013.01); *G06V 2201/10* (2022.01); *H04S 2400/11* (2013.01)

(58) Field of Classification Search
CPC ....... H04S 7/30; H04S 2400/11; G06V 20/46; G06V 2201/10; G11B 27/036
See application file for complete search history.

(56) References Cited

U.S. PATENT DOCUMENTS

| | | | |
|---|---|---|---|
| 9,646,620 B1 | 5/2017 | Oh et al. | |
| 10,063,907 B1 | 8/2018 | Darrah et al. | |
| 10,142,759 B2 | 11/2018 | Ugur et al. | |
| 10,187,737 B2 | 1/2019 | Chung et al. | |
| 10,200,804 B2 | 2/2019 | Chen et al. | |
| 10,609,440 B1 | 3/2020 | Wu et al. | |
| 10,674,208 B2 | 6/2020 | Thomas et al. | |
| 11,310,616 B2 | 4/2022 | Chin et al. | |
| 11,321,877 B1 * | 5/2022 | Mahyar | G06V 10/82 |

(Continued)

FOREIGN PATENT DOCUMENTS

| | | |
|---|---|---|
| JP | 7587391 B2 | 11/2024 |
| KR | 10-2022-0042990 A | 5/2022 |
| WO | 2013-008869 A1 | 1/2013 |

OTHER PUBLICATIONS

International Search Report and Written Opinion dated Oct. 11, 2023 for International Application PCT/KR2023/008943, from Korean Intellectual Property Office, pp. 1-11, Republic of Korea.

*Primary Examiner* — Thai Q Tran
*Assistant Examiner* — Jose M Mesa
(74) *Attorney, Agent, or Firm* — Sherman IP LLP; Kenneth L. Sherman; Steven Laut

(57) ABSTRACT

One embodiment provides a computer-implemented method that includes creating, during content production, an audio object and metadata associated with the audio object based on a motion vector analysis of an object in one or more image frames in a video. The method can include, during the content production, inserting the audio object and the metadata associated with the audio object into at least one of an audio encoder or a video encoder. The method can include, during content playback, rendering the audio object, without image frame analysis, based on decoding the audio object and parsing the metadata associated with the audio object.

18 Claims, 5 Drawing Sheets

(56) References Cited

U.S. PATENT DOCUMENTS

| | | |
|---|---|---|
| 11,450,071 B2 | 9/2022 | Stokking et al. |
| 2009/0040379 A1 | 2/2009 | Cho |
| 2010/0158099 A1* | 6/2010 | Kalva ................ H04N 21/4725 |
| | | 375/240.01 |
| 2014/0316543 A1 | 10/2014 | Sharma et al. |
| 2018/0308523 A1* | 10/2018 | Silvestri ............... G11B 27/036 |
| 2020/0288255 A1 | 9/2020 | Jung et al. |
| 2021/0240431 A1 | 8/2021 | Gorzel et al. |

* cited by examiner

400

```
┌─────────────────────────────────────────────────┐
│ Creating, During Content Production, An Audio   │
│ Object And Metadata Associated With The Audio   │──410
│ Object Based On A Motion Vector Analysis Of     │
│ An Object In One Or More Image Frames In A Video│
└─────────────────────────────────────────────────┘
                        │
                        ▼
┌─────────────────────────────────────────────────┐
│ Inserting, During The Content Production, The   │
│ Audio Object And The Metadata Associated With   │──420
│ The Audio Object Into At Least One Of An Audio  │
│ Encoder Or A Video Encoder                      │
└─────────────────────────────────────────────────┘
                        │
                        ▼
┌─────────────────────────────────────────────────┐
│ Rendering, During Content Playback, The Audio   │
│ Object Without Image Frame Analysis Based On    │──430
│ Decoding The Audio Object And Parsing The       │
│ Metadata Associated With The Audio Objec        │
└─────────────────────────────────────────────────┘
```

FIG. 4

VIDEO-DERIVED AUDIO PROCESSING

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to audio processing, and in particular, to video-derived audio processing for an end-to-end object-based audio system.

BACKGROUND

Conventional audio created for video (e.g., cinematic content, television (TV) shows, etc.) is formatted as channel-based audio (e.g., 2.0-stereo, 5.1, 7.1, 7.1.4), where the audio is created in a mix stage and post-produced by matching the audio to the video scene by an audio mix engineer.

Conventional technology requires a mix-engineer to match audio to video (for both computer-generated imagery (CGI) or video-captured cinematic content). The audio information (objects and other audio) are manually matched by the mix engineer to the video by using an audio panner where the mix-engineer manually places and pans moving audio objects in three-dimensional (3D) space to match audio with video. The object-based mix is then transmitted with position metadata to a cinema processor or a consumer renderer for decoding and panning to loudspeakers in a room (cinema or home).

A problem with conventional object audio technology is that there is no automation (e.g., artificial intelligence (AI)) involved in the production stage for mixing audio to video. Manually mixing audio to video incurs significant time and costs when content is created. This could result in late-to-market movie thereby impacting business. Audio and video are not tightly coupled by manual mixing of audio to match video. This may result in a mix that does not accurately match a director's intent or may reduce immersion (e.g., audio leading video or video leading audio when motion objects are in picture).

SUMMARY

One embodiment provides a computer-implemented method that includes creating, during content production, an audio object and metadata associated with the audio object based on a motion vector analysis of an object in one or more image frames in a video. The method can include, during the content production, inserting the audio object and the metadata associated with the audio object into at least one of an audio encoder or a video encoder. The method can include, during content playback, rendering the audio object, without image frame analysis, based on decoding the audio object and parsing the metadata associated with the audio object.

Another embodiment includes a non-transitory processor-readable medium that includes a program that when executed by a processor performs video-derived audio processing, including creating, by the processor, during content production, an audio object and metadata associated with the audio object based on a motion vector analysis of an object in one or more image frames in a video. The processor further performs inserting, during the content production, the audio object and the metadata associated with the audio object into at least one of an audio encoder or a video encoder. During content playback, the audio object is rendered, without image frame analysis, based on decoding the audio object and parsing the metadata associated with the audio object.

Still another embodiment provides an apparatus that includes a memory storing instructions, and at least one processor executes the instructions including a process configured to create, during content production, an audio object and metadata associated with the audio object based on a motion vector analysis of an object in one or more image frames in a video. During the content production, the process additionally inserts the audio object and the metadata associated with the audio object into at least one of an audio encoder or a video encoder. During content playback, the audio object is rendered, without image frame analysis, based on decoding the audio object and parsing the metadata associated with the audio object.

These and other features, aspects and advantages of the one or more embodiments will become understood with reference to the following description, appended claims and accompanying figures.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 4 illustrates a process for the disclosed technology implementing using video-derived audio processing for an end-to-end object-based audio system, according to some embodiments.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A description of example embodiments is provided on the following pages. The text and figures are provided solely as examples to aid the reader in understanding the disclosed technology. They are not intended and are not to be construed as limiting the scope of this disclosed technology in any manner. Although certain embodiments and examples have been provided, it will be apparent to those skilled in the art based on the disclosures herein that changes in the embodiments and examples shown may be made without departing from the scope of this disclosed technology.

One or more embodiments relate generally to a computer-implemented method that includes creating, during content production, an audio object and metadata associated with the audio object based on a motion vector analysis of one or more objects in one or more image frames in a video. The method can include, during the content production, inserting the audio object and the metadata associated with the audio object into at least one of an audio encoder or a video encoder. The method can include, during content playback, rendering the audio object, without image frame analysis, based on decoding the audio object and parsing the metadata associated with the audio object.

Some embodiments provide an end-to-end object-based audio system configured to employ video-based scene analysis to generate audio objects and metadata, wherein the metadata is at least one of a vector (e.g., position, velocity) or a video-object size (with corresponding audio-spread) used with at least one of a video codec or audio codec (e.g., encoder-decoder). One or more embodiments extract a motion vector from the one or more video frames that identify at least a target object, and performs at least one of retrieving, recommending, or synthesizing an audio object associated with the video target object. One or more embodiments apply one or more spatial rules to generate immersive sound (e.g., 7.1.4) from mono sound based on the motion vector, wherein the spatial rules include at least one of a panner for visual motion, a depth or distance of a visual object correlating with an audio level, or a size of a visual object correlating with a spread of audio among loudspeakers.

Figure 1:
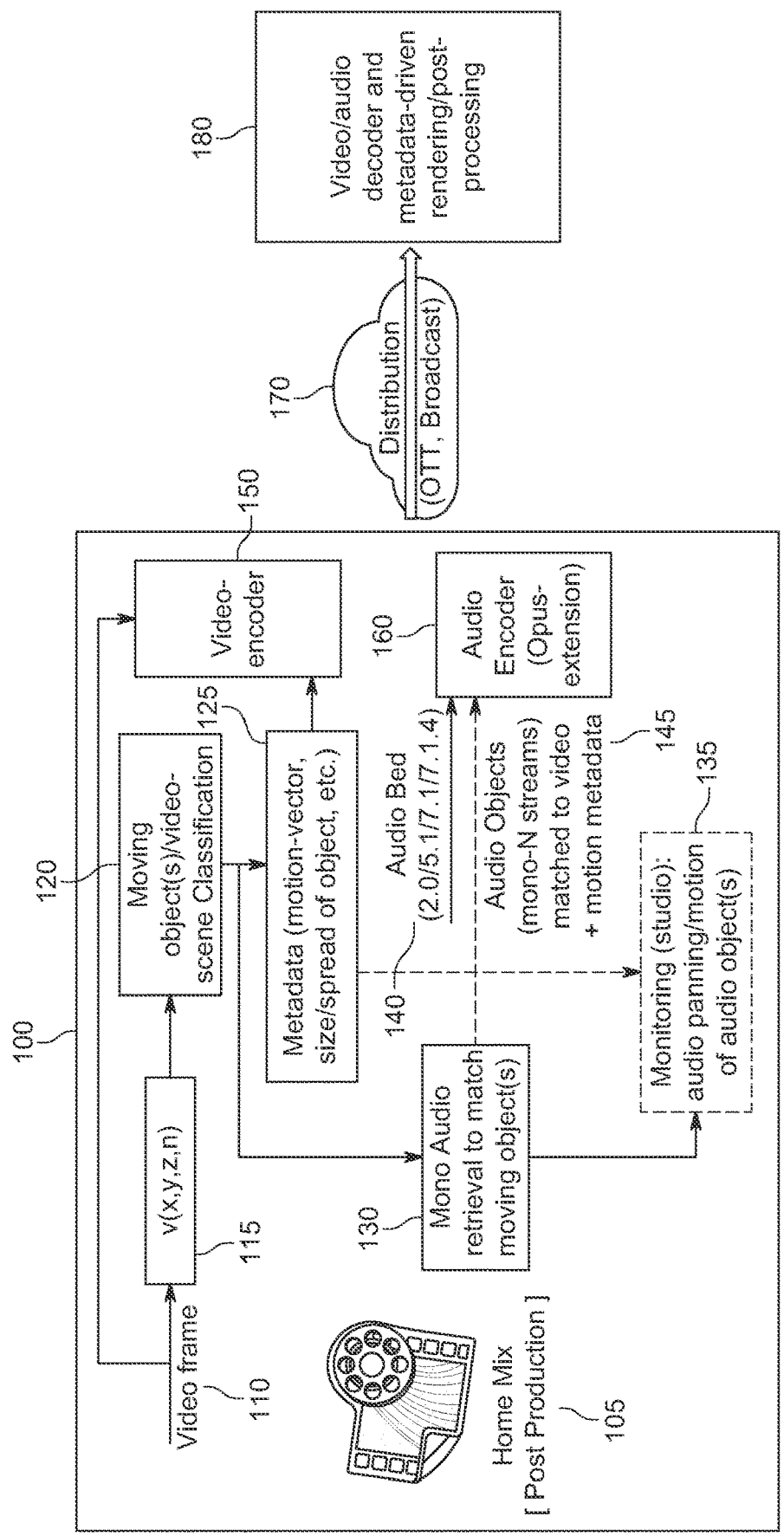
FIG. 1 illustrates a high-level flow diagram associated with the disclosed technology using video-derived audio processing for an end-to-end object-based audio system, according to some embodiments.

FIG. 1 illustrates a high-level flow diagram associated with the disclosed technology using video-derived audio processing for an end-to-end object-based audio system, according to some embodiments. In some embodiments, the pre-processing portion 100 receives a video frame 110 or a home mix 105 (post production) for the end-to-end approach (e.g., for HDR10+ Audio Standard Extension Scenario, Standardization) where the pre-processing portion 100 extracts scene/object motion vectors and delivers them to a TV (speakers), soundbar, headphones, ear buds, etc. (e.g., block 390, FIG. 3), which provides for standardization and minimizing video processing overhead in a system on chip (SoC). In block 115, the video frame 110 is delivered to a scene-segmentation and object-classifier module 120. Block 120 performs extraction of motion-vector from video frames of dominant (e.g., static) or moving object(s) (e.g., a drone, etc.) The motion vector is associated with the position/location of a video-based object from adjacent frames, and may additionally include velocity and acceleration of the moving video-object in these frames and derived trajectory (relative to center of video-frame). The results of block 120 are incorporated as metadata in block 125, which is input to a video encoder 150, and is also input to block 130 that processes the data for mono audio retrieval for matching a moving object(s). The metadata may also be inserted with the audio encoder 160. The output from block 130 is input to an audio encoder 160 and optionally to block 135 for monitoring (studio) audio panning/motion of an audio object(s). Additionally, as input into the audio encoder 160, audio bed 140 (2.0/5.1/7.1/7.14) and audio object 145 (mono-N streams) are matched to video plus motion metadata. In some embodiments, the audio encoder 160 may behave an opus extension (Opus is an open source, royalty-free, and highly versatile audio codec).

In some embodiments, the output from pre-processing portion 100 flows to a distribution portion 170 where the output from pre-processing portion 100 is distributed to be used by a user's electronic device (e.g., TV, soundbar, headphones, earbuds, etc.). The distribution portion 170 may be an over-the-top (OTT) media service, a broadcast service, etc.). In one or more embodiments, in block 180 the distributed information/data is received for application of panning rules to create, for example, 7.1.4 from mono using motion-vector processing (motion vectors may be used to compress video by storing the changes to an image from one frame to the next). Block 180 also provides applying a down-mix from enhanced 7.1.4 to 2.0 for headphones, and may additionally extend the technique towards multiple proof of concept's (PoC's) for various use-cases.

In some embodiments, the pre-processing portion 100 creates, during a content production stage, an audio object 145 and metadata 125 associated with the audio object 145 based on analyzing a motion vector of an object in one or more image frames in a video and without analyzing audio associated with the image frames, wherein creating the audio object 145 includes retrieving the audio object 145 based on audio data from an audio database that includes one or more audio clips separately acquired from the video. In one example embodiment, in the production stage, a video scene is analyzed (without analyzing the video scene's audio) to identify a moving rocket, and then some embodiments generate an optimal sound for the moving rocket from a database of many rocket sounds (where at least some of the rocket sounds were not recorded together with the video scene). In one or more embodiments, inserting, during the content production stage, the audio object 145, and the metadata 125 associated with the audio object 145 into at least one of the audio encoder 160 or the video encoder 150. In one example, the optimal rocket sound for the moving rocket is generated at the production stage, and then the technology encodes this optimal rocket sound and its metadata 125. During a content playback stage, some embodiments provide rendering of the audio object 145 (such as without image frame analysis) based on decoding the audio object 145 and parsing the metadata 125 associated with the audio object 145. In one example: on a consumer's TV, the TV does not need to analyze the video. The TV can decode the encoded optimal rocket sound and parse the optimal rocket sound's metadata 125 in order to play the optimal rocket sound for the video scene of the moving rocket.

Figure 2:
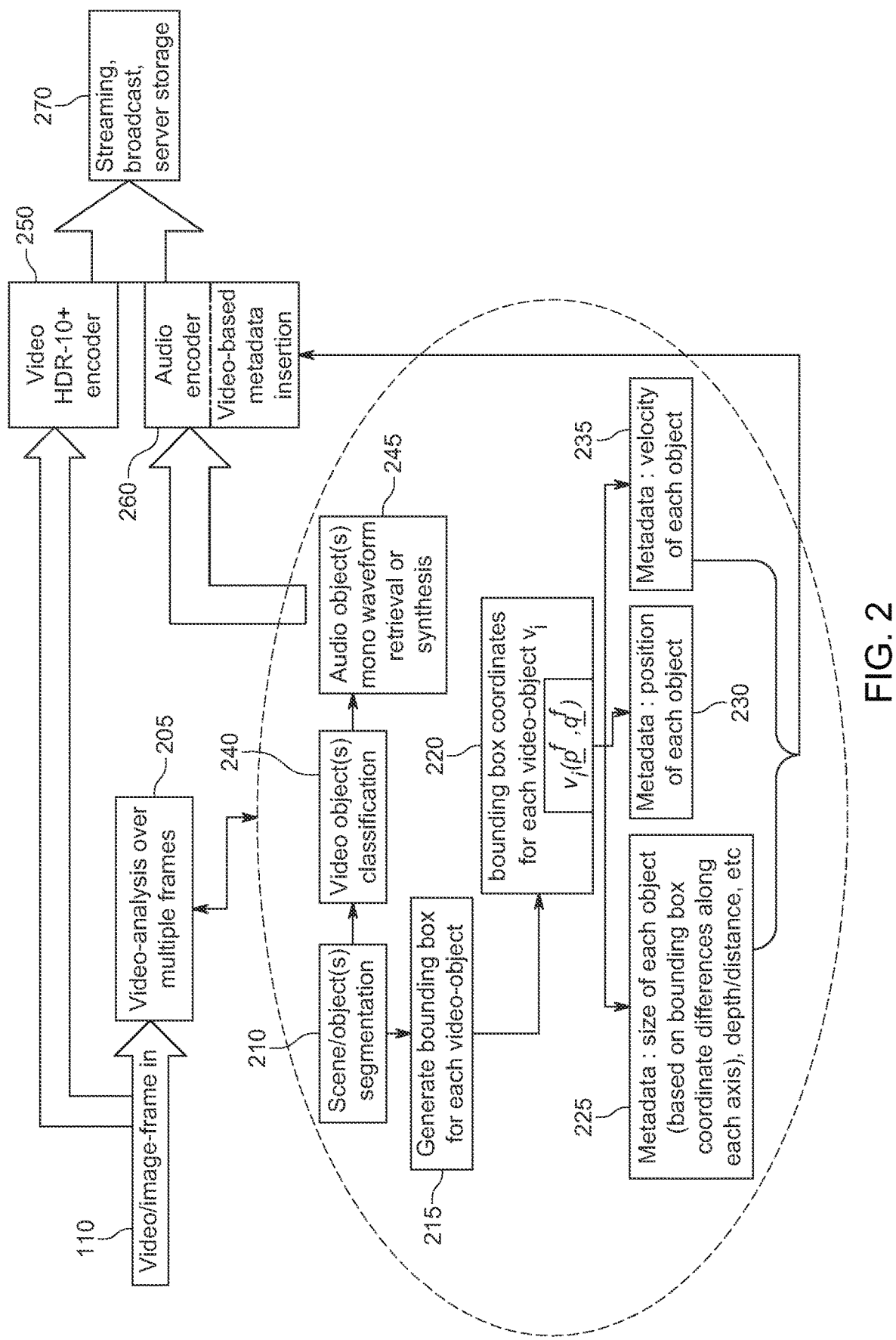
FIG. 2 illustrates a lower-level flow diagram of the system of FIG. 1, according to some embodiments.

FIG. 2 illustrates a lower-level flow diagram of the system of FIG. 1, according to some embodiments. Some embodiments automatically create audio signals and metadata based on video (synthetic as in games or computer-generated imagery (CGI) movies, or real video captured as in conventional movies) analysis. The audio signals and its metadata (video-derived audio properties) are transmitted to the consumer for playback on TVs, headphones, earbuds, soundbars, etc.

In one or more embodiments, the video/image frame 110 is input to a video-analysis block 205 that provides analysis over multiple frames. The video/image frame 110 is also input to a video (HDR-10+) encoder 250. The information from the video-analysis block 205 is utilized by block 210 for scene/object(s) segmentation that splits a scene into its various object components. The output from the block 205 is provided to block 215 that generates a bounding box for each video-object, and also to block 240 that performs video object(s) classification. In some embodiments, the result of block 215 is utilized by block 220 that provides bounding box coordinates for each video-object $v_i(v_i(\underline{p}^f,\underline{q}^f))$, where $\underline{p},\underline{q}$ are the spatial co-ordinates of a bounding box which is bounding the video object of interest, f is the frame-index and i is an integer. The bounding box coordinates from block 220 are utilized by: block 225 that provides metadata for the size of each object (based on bounding box coordinate differences along each axis, depth/distance, etc.); block 230 that provides metadata for position of each object; and block 235 that provides metadata for velocity of each object.

In one or more embodiments, the results from block 240 are utilized by block 245 that provides audio object(s) mono waveform retrieval or synthesis. The results from block 245 are utilized by an audio encoder 260 and optionally the resulting metadata from blocks 225, 230 and 235 is utilized by the audio encoder 260. The encoded video from the video encoder 250 and encoded audio and metadata from the audio encoder 260 are utilized by block 270 that provides streaming, broadcast and/or server storage.

Figure 3:
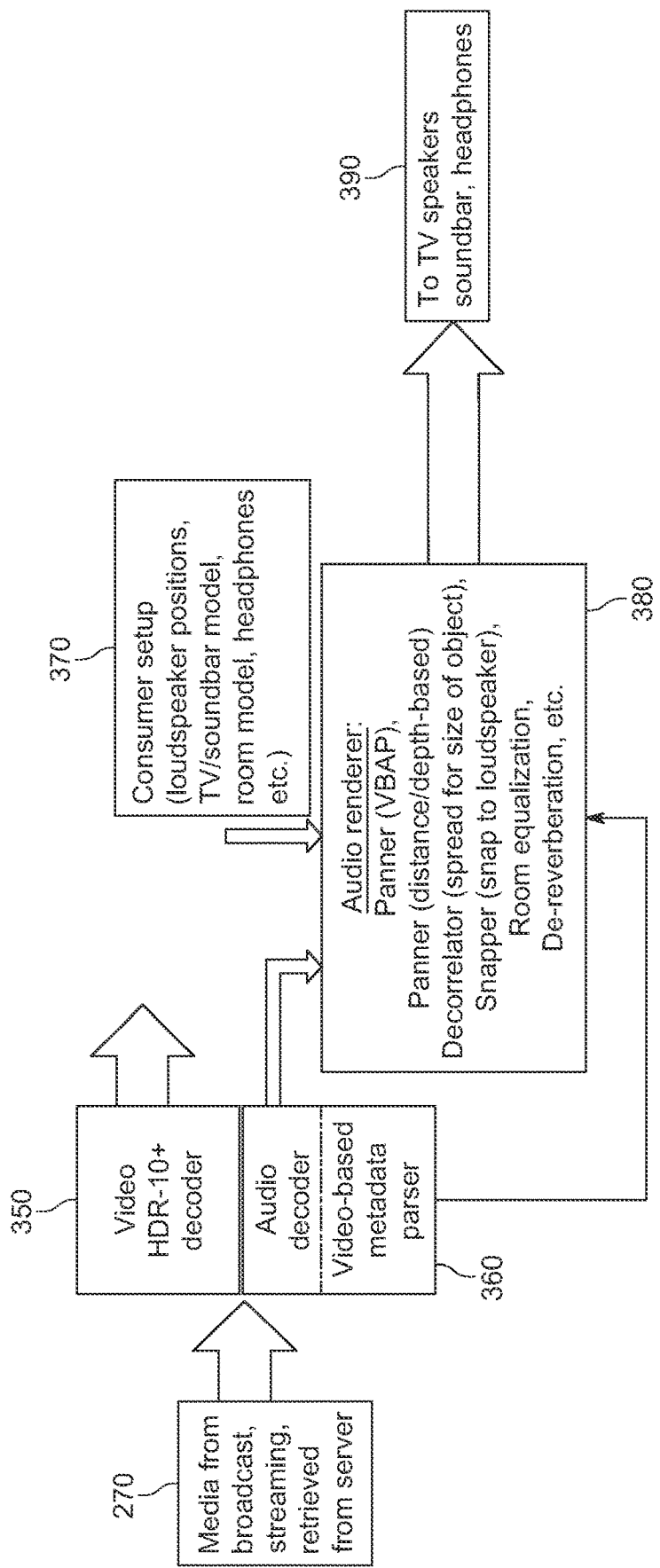
FIG. 3 illustrates a flow diagram for receiving the output from the end-to-end object-based audio system shown in FIG. 2, according to some embodiments.

FIG. 3 illustrates a flow diagram for receiving the output from the end-to-end object-based audio system shown in FIG. 2, according to some embodiments. In one or more embodiments, the results from block 270 that are received are utilized by a video (HDR-10+) decoder 350 and audio decoder 360 (with optional video-based metadata parser 360). The video would be utilized by a display (e.g., TV, monitor, projector, cell phone, tablet device, etc.). The decoded audio from the audio decoder 360 is utilized by an audio renderer 380 (e.g., panner (vector-base amplitude panning (VBAP)), panner (distance/depth-based), a decorrelator (spread for size of object), snapper (snap to loudspeaker), room equalization, de-reverberation, etc. Additionally, input (e.g., consumer setup information (e.g., loudspeaker positions, TV/soundbar model, room model, headphones, etc.)) from block 370 is utilized by block 380. The results from block 380 are then utilized by block 390 (e.g., to TV speakers, soundbar, headphones, earbuds, etc.).

In some embodiments, the video-analysis over multiple frames in block 205 (FIG. 2) is performed on a cloud-based server/system or a workstation, in a mixing stage, and audio stems (viz., waveforms) are (i) first retrieved automatically by segmenting (block 210, FIG. 2) desired video object of interest (e.g., a moving drone) $v_1(\underline{p}^f,\underline{g}^f)$ in a video-frame, (ii) classifying the video object (in block 240, FIG. 2) using artificial intelligence (AI), (iii) retrieving (or synthesizing) an audio signal (in block 245, FIG. 2) $x_1(n)$ of the corresponding video object $v_1(\underline{p}^f,\underline{g}^f)$ from a database using an AI model, (iv) generating the motion vector (viz., position vector for each video frame f) of the video object, (v) and mapping the video-object position vector of the on-screen video object as an input of the audio renderer 380, (vi) applying vector-based amplitude panning, decorrelation, etc., on the audio signal based on video-based position vector. The audio renderer 380 takes the coordinates and snaps the corresponding audio $x_1(n)$ to a loudspeaker (block 390) or pans the audio in-between multiple loudspeakers in 3D audio space. The position and other video-object information, along with corresponding audio objects $x_1(n)$, are also transmitted as metadata and coded audio through the streaming and broadcast distribution pipeline.

In one or more embodiments, at the consumer end, the metadata and corresponding encoded audio is parsed and decoded (audio decoder 360), respectively, and the corresponding renderer 380 on the consumer-end (e.g., in TVs, soundbars, headphones, earbuds, etc.) renders the spatial audio to loudspeakers (block 390) to mimic a mix-stage (e.g., Hollywood studio) experience.

In some embodiments, the disclosed technology may be utilized in mix stages, integrated with HDR10+ video solution, played back on a TV, soundbars, headphones, earbuds, smartphones, etc. One or more embodiments may be implemented for authoring, e.g., drone video frames (one moving object but extensible to several), drone mono audio panned to height/surround (7.1.4) using video-based motion-vector and VBAP, rendering in reference 7.1.4 room and on a soundbar, spatial rendering from the enhanced 7.1.4 to 2.0 for headphone listening, etc.

FIG. 4 illustrates a process 400 for the disclosed technology implementing video-derived audio processing for an end-to-end object-based audio system, according to some embodiments. In one or more embodiments, in block 410, process 400 provides creating, during content production, an audio object and metadata associated with the audio object (e.g., audio object 145, FIG. 1) based on a motion vector analysis (e.g., block 205, FIG. 2) of an object in one or more image frames (e.g., video/image frame 110, FIG. 1) in a video. In block 420, process 400 provides inserting, during the content production, the audio object and the metadata (e.g., block 225, block 230, block 235, FIG. 2) associated with the audio object into at least one of an audio encoder (audio encoder 260) or a video encoder (video encoder 250). In block 430, process 400 provides rendering (e.g., utilizing audio renderer 380, FIG. 3), during content playback, the audio object, without image frame analysis, based on decoding the audio object (e.g., with audio decoder 360, FIG. 3) and parsing the metadata (e.g., via a video-based metadata parser of the audio decoder 360) associated with the audio object.

In some embodiments, process 400 further provides that creating the audio object includes deriving the audio object based on audio data from an audio database (e.g., home mix 105) that includes one or more audio clips separately acquired from the video.

In one or more embodiments, process 400 additionally provides that the metadata includes one or more of a vector (e.g., position, velocity) or a spread used with at least one of a video codec or audio codec.

In some embodiments, process 400 further includes extracting a motion vector from the one or more image frames (e.g., block 120, FIG. 1) that identify at least a target object, and performing at least one of retrieving, recommending, or synthesizing an audio object associated with the target object (e.g., block 245, FIG. 2).

In one or more embodiments, process 400 includes the feature of applying one or more spatial rules to generate immersive sound from mono sound based on the motion vector (e.g., via audio renderer 380, FIG. 3).

In some embodiments, process 400 additionally provides that the spatial rules include at least one of a panner for visual motion, a depth or distance of a visual object correlating with an audio level, or a size of a visual object correlating with a spread of audio among loudspeakers (block 390) of an electronic device.

In one or more embodiments, process 400 further provides the feature of generating a bounding box (e.g., block 215, FIG. 2) for the visual object, and deriving bounding box coordinates (e.g., block 220, FIG. 2) for the visual object, and extracting metadata (blocks 225, 230 and 235) associated with the visual object. The metadata is associated with the visual object and include one or more of size (block 225) of the visual object, position (block 230) of the visual object or velocity (block 235) of the visual object.

The conventional technology conduct processing on the consumer device side, and they analyze already-produced/existing (at the studio) video and audio. Distinguishable, some embodiments start at the content production side (at the studio) and only analyzes video without analyzing any audio. Further, the conventional technology only modifies the already-produced/existing (at the studio) audio. In contrast, one or more embodiments generates new audio, which can be derived from an audio database including (but not limited to) audio clips that were acquired/recorded completely separately from the already-produced/existing audio.

Figure 5:
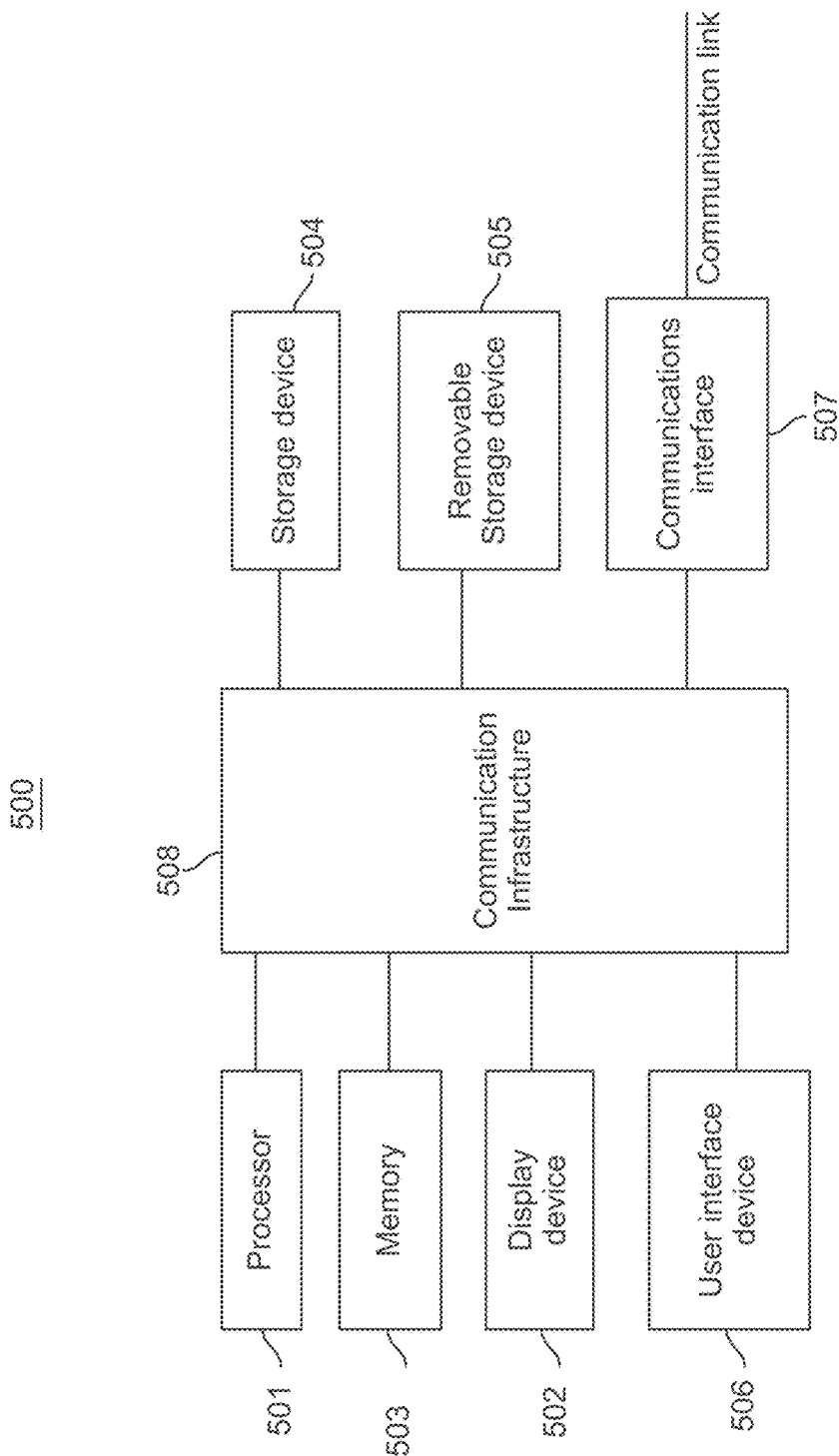
FIG. 5 illustrates a high-level block diagram showing an information processing system comprising a computer system useful for implementing the disclosed embodiments.

FIG. 5 is a high-level block diagram showing an information processing system comprising a computer system 500 useful for implementing the disclosed embodiments. Computer system 500 may be incorporated in an electronic device, such as a television, a sound bar, headphones, earbuds, tablet device, etc. The computer system 500 includes one or more processors 501, and can further include an electronic display device 502 (for displaying video, graphics, text, and other data), a main memory 503 (e.g., random access memory (RAM)), storage device 504 (e.g., hard disk drive), removable storage device 505 (e.g., removable storage drive, removable memory module, a magnetic tape drive, optical disk drive, computer readable medium having stored therein computer software and/or data), user interface device 506 (e.g., keyboard, touch screen, keypad, pointing device), and a communication interface 507 (e.g., modem, a network interface (such as an Ethernet card), a communications port, or a PCMCIA slot and card). The communication interface 507 allows software and data to be transferred between the computer system and external devices. The system 500 further includes a communications infrastructure 508 (e.g., a communications bus, cross-over bar, or network) to which the aforementioned devices/modules 501 through 507 are connected.

Information transferred via communications interface 507 may be in the form of signals such as electronic, electromagnetic, optical, or other signals capable of being received by communications interface 507, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

In some embodiments, processing instructions for process 400 (FIG. 4) may be stored as program instructions on the memory 503, storage device 504 and the removable storage device 505 for execution by the processor 501.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A computer-implemented method comprising:
   creating, during content production, an audio object and metadata associated with the audio object based on a motion vector analysis of an object in one or more image frames in a video;
   inserting, during the content production, the audio object and the metadata associated with the audio object into at least one of an audio encoder or a video encoder;
   applying one or more spatial rules to generate immersive sound from mono sound based on a motion vector extracted from the one or more image frames; and
   rendering, during content playback, the audio object, without image frame analysis, based on decoding the audio object and parsing the metadata associated with the audio object.

2. The computer-implemented method of claim 1, wherein creating the audio object includes deriving the audio object based on audio data from an audio database that includes one or more audio clips separately acquired from the video.

3. The computer-implemented method of claim 1, wherein the metadata comprises one or more of a vector or a spread used with at least one of a video codec or audio codec.

4. The computer-implemented method of claim 1, further comprising:
   performing at least one of retrieving, recommending, or synthesizing an audio object associated with the target object;
   wherein the motion vector is extracted from the one or more image frames that identify at least a target object.

5. The computer-implemented method of claim 1, wherein the spatial rules include at least one of a panner for visual motion, a depth or distance of a visual object correlating with an audio level, or a size of a visual object correlating with a spread of audio among loudspeakers of an electronic device.

6. The computer-implemented method of claim 5, further comprising:
   generating a bounding box for the visual object;
   deriving bounding box coordinates for the visual object; and extracting metadata associated with the visual object, wherein the metadata associated with the visual object comprises one or more of size of the visual object, position of the visual object or velocity of the visual object.

7. A non-transitory processor-readable medium that includes a program that when executed by a processor performs video-derived audio processing, comprising:
creating, by the processor, during content production, an audio object and metadata associated with the audio object based on a motion vector analysis of an object in one or more image frames in a video;
inserting, by the processor, during the content production, the audio object and the metadata associated with the audio object into at least one of an audio encoder or a video encoder;
applying one or more spatial rules to generate immersive sound from mono sound based on a motion vector extracted from the one or more image frames; and
rendering, during content playback, the audio object, without image frame analysis, based on decoding the audio object and parsing the metadata associated with the audio object.

8. The non-transitory processor-readable medium of claim 7, wherein creating the audio object includes deriving the audio object based on audio data from an audio database that includes one or more audio clips separately acquired from the video.

9. The non-transitory processor-readable medium of claim 7, wherein the metadata comprises one or more of a vector or a spread used with at least one of a video codec or audio codec.

10. The non-transitory processor-readable medium of claim 7, further comprising:
performing, by the processor, at least one of retrieving, recommending, or synthesizing an audio object associated with the target object;
wherein the motion vector is extracted from the one or more image frames that identify at least a target object.

11. The non-transitory processor-readable medium of claim 7,
wherein the spatial rules include at least one of a panner for visual motion, a depth or distance of a visual object correlating with an audio level, or a size of a visual object correlating with a spread of audio among loudspeakers of an electronic device.

12. The non-transitory processor-readable medium of claim 11, further comprising:
generating, by the processor, a bounding box for the visual object;
deriving, by the processor, bounding box coordinates for the visual object; and
extracting, by the processor, metadata associated with the visual object, wherein the metadata associated with the visual object comprises one or more of size of the visual object, position of the visual object or velocity of the visual object.

13. An apparatus comprising:
a memory storing instructions; and
at least one processor executes the instructions including a process configured to:
create, during content production, an audio object and metadata associated with the audio object based on a motion vector analysis of an object in one or more image frames in a video;
insert, during the content production, the audio object and the metadata associated with the audio object into at least one of an audio encoder or a video encoder;
apply one or more spatial rules to generate immersive sound from mono sound based on a motion vector extracted from the one or more image frames; and
render, during content playback, the audio object, without image frame analysis, based on decoding the audio object and parsing the metadata associated with the audio object.

14. The apparatus of claim 13, wherein creating the audio object includes deriving the audio object based on audio data from an audio database that includes one or more audio clips separately acquired from the video.

15. The apparatus of claim 13, wherein the metadata comprises one or more of a vector or a spread used with at least one of a video codec or audio codec.

16. The apparatus of claim 13, wherein:
the process is further configured to:
perform at least one of retrieving, recommending, or synthesizing an audio object associated with the target object; and
the motion vector is extracted from the one or more image frames that identify at least a target object.

17. The apparatus of claim 13, wherein the process is further configured to:
wherein the spatial rules include at least one of a panner for visual motion, a depth or distance of a visual object correlating with an audio level, or a size of a visual object correlating with a spread of audio among loudspeakers of an electronic device.

18. The apparatus of claim 17, wherein the process is further configured to:
generate a bounding box for the visual object;
derive bounding box coordinates for the visual object; and
extract metadata associated with the visual object, wherein the metadata associated with the visual object comprises one or more of size of the visual object, position of the visual object or velocity of the visual object.

* * * * *